(12) United States Patent
Zhang

(10) Patent No.: US 11,878,668 B2
(45) Date of Patent: Jan. 23, 2024

(54) STEERING WHEEL ASSEMBLY HAVING BRAKING FUNCTION AND CONTROL APPARATUS HAVING THE STEERING WHEEL ASSEMBLY

(71) Applicant: Zhaoqi Zhang, Hunan (CN)

(72) Inventor: Zhaoqi Zhang, Hunan (CN)

( * ) Notice: Subject to any disclaimer, the term of this patent is extended or adjusted under 35 U.S.C. 154(b) by 0 days.

(21) Appl. No.: 17/778,170

(22) PCT Filed: Nov. 10, 2020

(86) PCT No.: PCT/CN2020/127681
§ 371 (c)(1),
(2) Date: May 19, 2022

(87) PCT Pub. No.: WO2021/104001
PCT Pub. Date: Jun. 3, 2021

(65) Prior Publication Data
US 2022/0410851 A1    Dec. 29, 2022

(30) Foreign Application Priority Data
Nov. 27, 2019    (CN) .......................... 201911180398.0

(51) Int. Cl.
*B60T 7/12*    (2006.01)
*B60T 7/08*    (2006.01)
*B62D 1/04*    (2006.01)
*B60R 16/023*    (2006.01)

(52) U.S. Cl.
CPC ............ *B60T 7/12* (2013.01); *B60R 16/0231* (2013.01); *B60T 7/085* (2013.01); *B62D 1/04* (2013.01)

(58) Field of Classification Search
CPC .. B62D 1/04; B62D 1/046; B60T 7/12; B60T 7/085
See application file for complete search history.

(56) References Cited

U.S. PATENT DOCUMENTS

| 6,263,753 B1 * | 7/2001 | Froehlich ............... G05G 11/00 74/486 |
| 2004/0143379 A1 * | 7/2004 | Borroni-Bird .......... B60T 7/085 701/36 |

(Continued)

FOREIGN PATENT DOCUMENTS

| CN | 2136778 Y | 6/1993 |
| CN | 2199904 Y | 6/1995 |

(Continued)

OTHER PUBLICATIONS

International search report of PCT/CN2020/127681.

*Primary Examiner* — Daniel D Yabut

(57) ABSTRACT

A steering wheel assembly having a braking function, including: a steering wheel, a steering shaft, and a controller. The steering wheel is connected to one end of the steering shaft. The steering wheel includes a rim body and spokes. The rim body is connected to the steering shaft via the spokes. A force sensor, a photoelectric sensor, a mechanical wave sensor or a switch are provided between the rim body and the spokes, or provided on one side of the rim body away from a driver, or provided between the spokes and the steering shaft, or provided on the steering shaft, and are connected to the controller. The controller is connected to a braking system.

9 Claims, 10 Drawing Sheets

(56) References Cited

U.S. PATENT DOCUMENTS

| | | | |
|---|---|---|---|
| 2005/0067889 A1* | 3/2005 | Chernoff | B60L 7/18 |
| | | | 303/119.2 |
| 2006/0082090 A1 | 4/2006 | Constans | |
| 2007/0114773 A1* | 5/2007 | Borroni-Bird | B60K 37/06 |
| | | | 280/788 |
| 2014/0224600 A1 | 8/2014 | Rosenbaum | |

FOREIGN PATENT DOCUMENTS

| | | | |
|---|---|---|---|
| CN | 103738319 A | | 4/2014 |
| CN | 104554418 A | * | 4/2015 |
| CN | 205632447 U | | 10/2016 |
| CN | 108058699 A | * | 5/2018 |
| CN | 108146411 A | * | 6/2018 |
| CN | 108202728 A | | 6/2018 |
| CN | 108216162 A | * | 6/2018 |
| CN | 109823322 A | | 5/2019 |
| CN | 110667689 A | | 1/2020 |
| CN | 211107651 U | | 7/2020 |
| DE | 102005035996 A1 | | 3/2007 |

\* cited by examiner

STEERING WHEEL ASSEMBLY HAVING BRAKING FUNCTION AND CONTROL APPARATUS HAVING THE STEERING WHEEL ASSEMBLY

TECHNICAL FIELD

The present invention relates to a steering wheel assembly, and in particular to a braking control structure of a steering mechanism.

BACKGROUND

At present, brakes of vehicles like automobiles or other mechanical devices are usually in the form of pedals, which are close to accelerator pedals and operated in a similar way as accelerator pedals. Therefore, when a driver operates vehicles abnormally or is emotionally unstable, an operation error tends to occur. Some drivers even drive in high heels or slippers, which increases the risk of maloperation. It is also possible that sometimes a driver just could not react fast enough to figure out which pedal is the brake. If an accelerator is mistaken for the brake, especially in an emergency, serious consequences and great losses may be caused.

In order to solve this problem, in some technical schemes, a brake button is provided on a steering wheel, or a pressure sensor is attached to a steering wheel to measure the gripping tightness of a driver, and corresponding control apparatuses are also adopted for automatic braking when it is determined that braking is required, such as the Chinese utility model patent with the authorized publication number of CN204250008U and the Chinese invention patent application with the published application number of CN105730423A. However, these technical means may have the following problems. As a steering wheel can rotate, a driver may not be able to quickly and accurately press the brake button on the steering wheel in an emergency. Attaching a circle of pressure sensors to the steering wheel and analyzing grip strength characteristics may cause maloperation or unreliable triggering of a braking action.

In addition, some existing schemes are too complex and costly to be accepted by automobile manufacturers (especially for low-priced cars with low-level configurations), which makes it difficult to popularize the related art.

SUMMARY

In view of the shortcomings and problems of the background art, the present invention aims for improvement and innovation by providing a steering wheel assembly which can trigger braking and related protection actions. The steering wheel assembly is convenient to operate, easy for a user to learn and use, high in reliability and low in implementation cost, imposes only a light memory burden on a user, and has great compatibility with the existing operation schemes.

In a technical scheme of the present invention, provided is a steering wheel assembly having a braking function, including: a steering wheel, a steering shaft, and a controller, where the steering wheel is connected to one end of the steering shaft and includes a rim body and spokes, the rim body being connected to the steering shaft via the spokes; a force sensor, and a photoelectric sensor, a mechanical wave sensor or a switch are provided between the rim body and the spokes, or on one side of the rim body away from a driver, or between the spokes and the steering shaft, or on the steering shaft, or on a mechanical component adjacent to the steering wheel or the steering shaft; the force sensor, and the photoelectric sensor, the mechanical wave sensor or the switch are connected to the controller and send data related to force detection, distance measurement or on-off logic detection to the controller; the controller is connected to a braking system; and instructions between the force sensor, and the photoelectric sensor, the mechanical wave sensor or the switch and the controller or between the controller and the braking system can be transmitted by wired or wireless means.

In the case that the force sensor is provided on the steering shaft, the steering shaft is of a hollow structure, within which a connecting disk connected to a top portion via a connecting rod and a connecting cylinder having an opening in at least one end are provided, the connecting rod passing through the opening; at least one supporting spring is provided between an area around the opening and the connecting disk; and when the supporting spring is compressed to a certain extent, the force sensor is compressed and the connecting cylinder extends out from the other end of the steering shaft directly or through an intermediate connector.

In the case that the force sensor is provided on the steering shaft, the steering shaft is of a hollow structure, within which two hooks in opposite directions are provided, a stem of one of the hooks being fixed to a top portion of the hollow structure and a stem of the other hook extending out from the other end of the steering shaft directly or through an intermediate connector.

In the case that the force sensor is provided on the steering shaft, a first bearing table is further provided, a second bearing table is provided on the steering shaft, the force sensor is provided between the first bearing table and the second bearing table, and a limiting means corresponding to the second bearing table is also provided.

The steering shaft includes an upper half and a lower half, and the force sensor is provided between the upper half and the lower half.

A one-way displacement control means is further provided at a position where the force sensor is mounted, the one-way displacement control means includes keyways provided at two ends, respectively, of the position where the force sensor is mounted and a key, with the key sliding only in one direction along the keyways, so that the force sensor is only pressed in one direction.

In another technical scheme of the present invention, provided is a control apparatus or device with the aforementioned steering wheel assembly, including but not limited to, automobiles, engineering machinery, ships, airplanes, agricultural machinery, driving training simulators, remote driving controllers, game controllers, etc., or as components thereof.

The present invention has the following advantages and beneficial effects: The pulling force sensor is provided on the steering wheel assembly, so that a pulling force exerted by a driver on the steering wheel can be measured in real time. When a pulling force detected by the sensor does not exceed a threshold value, no instruction is generated and no action is triggered. When the pulling force detected by the sensor exceeds the threshold value, the controller sends an instruction to the braking system to trigger a braking action. When the pulling force exceeds the threshold value, other protection or emergency stop instructions related to the functions of the device can be sent out besides the braking instruction, such as instructions for disabling an accelerator pedal, a sprinkling truck, a harvester, a blender, etc. Multiple threshold values can be set to trigger braking actions with different effects under different pulling forces. Brake slowly when pulling lightly, and brake hard when pulling heavily. In this way, a driver only needs to remember that "I can brake by pulling the steering wheel". The braking operation is completely different from an accelerating operation, does not affect the traditional driving mode, and can minimize the occurrence of mistaking an accelerator for a brake. The braking operation is an important supplement to the existing braking operation, and can even replace the existing braking operation mode. The present invention can be applied not only to vehicles using traditional energy sources such as gasoline and diesel oil, but also to vehicles using relatively new energy sources such as electric energy, solar energy, natural gas, alcohols, and hydrogen. Even today, with the rapid advancement of driving automation, this braking operation, as an alternative braking method, can still play a significant role when used for manual emergency braking under extraordinary circumstances. The present invention is simple in structure, stable, reliable, and low in cost, and has great popularization prospect.

DETAILED DESCRIPTION

In order to facilitate the understanding of the present invention, the present invention will be described below more comprehensively with reference to relevant drawings. Preferred embodiments of the present invention are shown in the accompanying drawings. However, the present invention can be implemented in various forms and is not limited to the embodiments described herein. Instead, these embodiments are provided to make the disclosure of the present invention more thorough and complete.

It should be noted that when an element is considered to be "provided" on another element, it may be directly provided on or connected to another element (including an end portion) or there may also exist an intermediate element.

Unless otherwise defined, all the technical and scientific terms used herein have the same meanings as those commonly understood by those skilled in the art to which the present invention pertains. The terms used in the specification are only for the purpose of describing specific embodiments, and are not intended to limit the present invention.

Embodiment I

Figure 1:
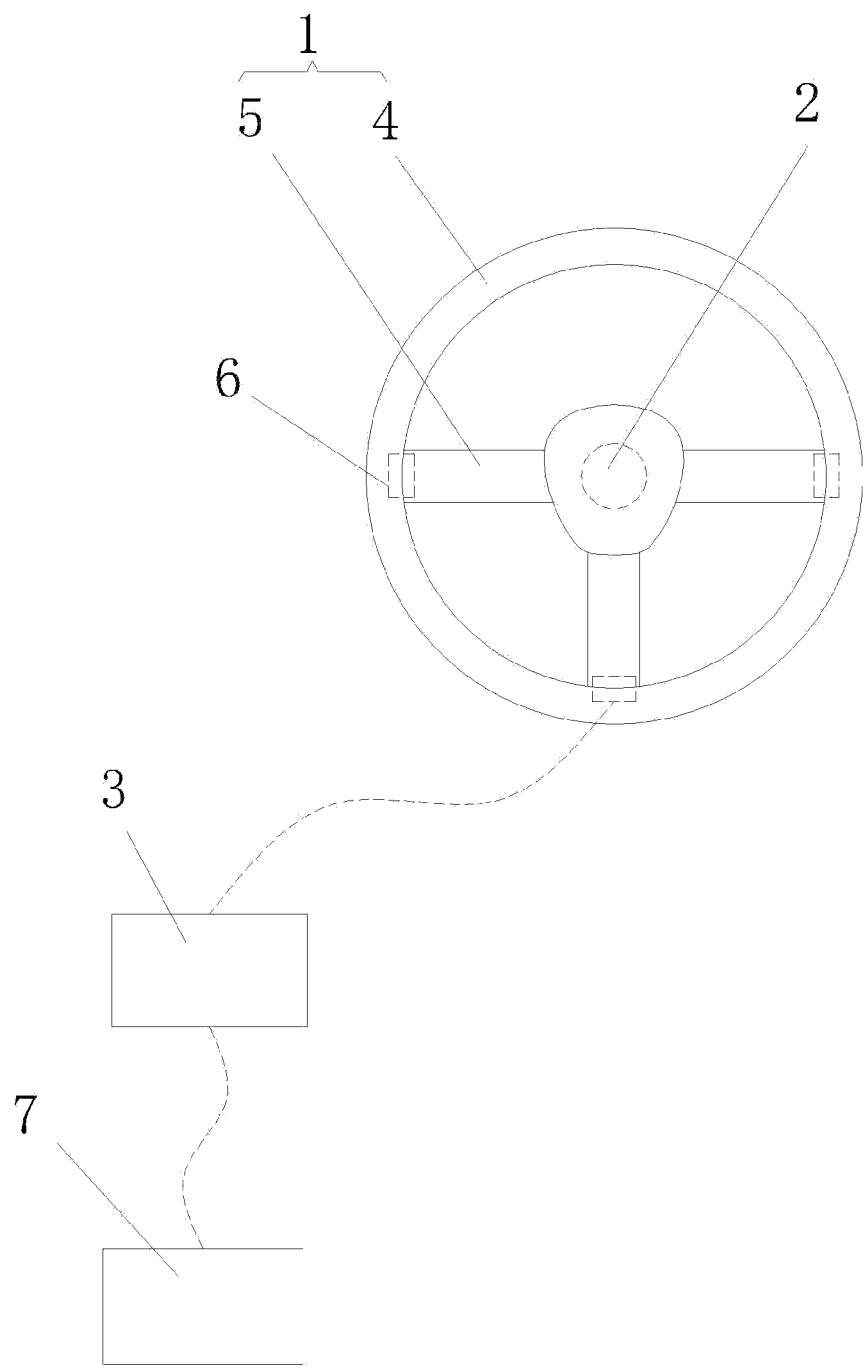
FIG. 1 is a schematic diagram of an overall structure of Embodiment I.

As shown in FIG. 1, a steering wheel assembly having a braking function includes: a steering wheel 1, a steering shaft 2, and a controller 3. The steering wheel 1 is connected to one end of the steering shaft 2. The steering wheel 1 includes a rim body 4 and spokes 5. The rim body 4 is connected to the steering shaft 2 via the spokes 5. A force sensor 6 is provided between the rim body 4 and the spokes 5. The force sensor 6 is connected to the controller 3. The controller 3 is connected to a braking system 7.

Figure 8:
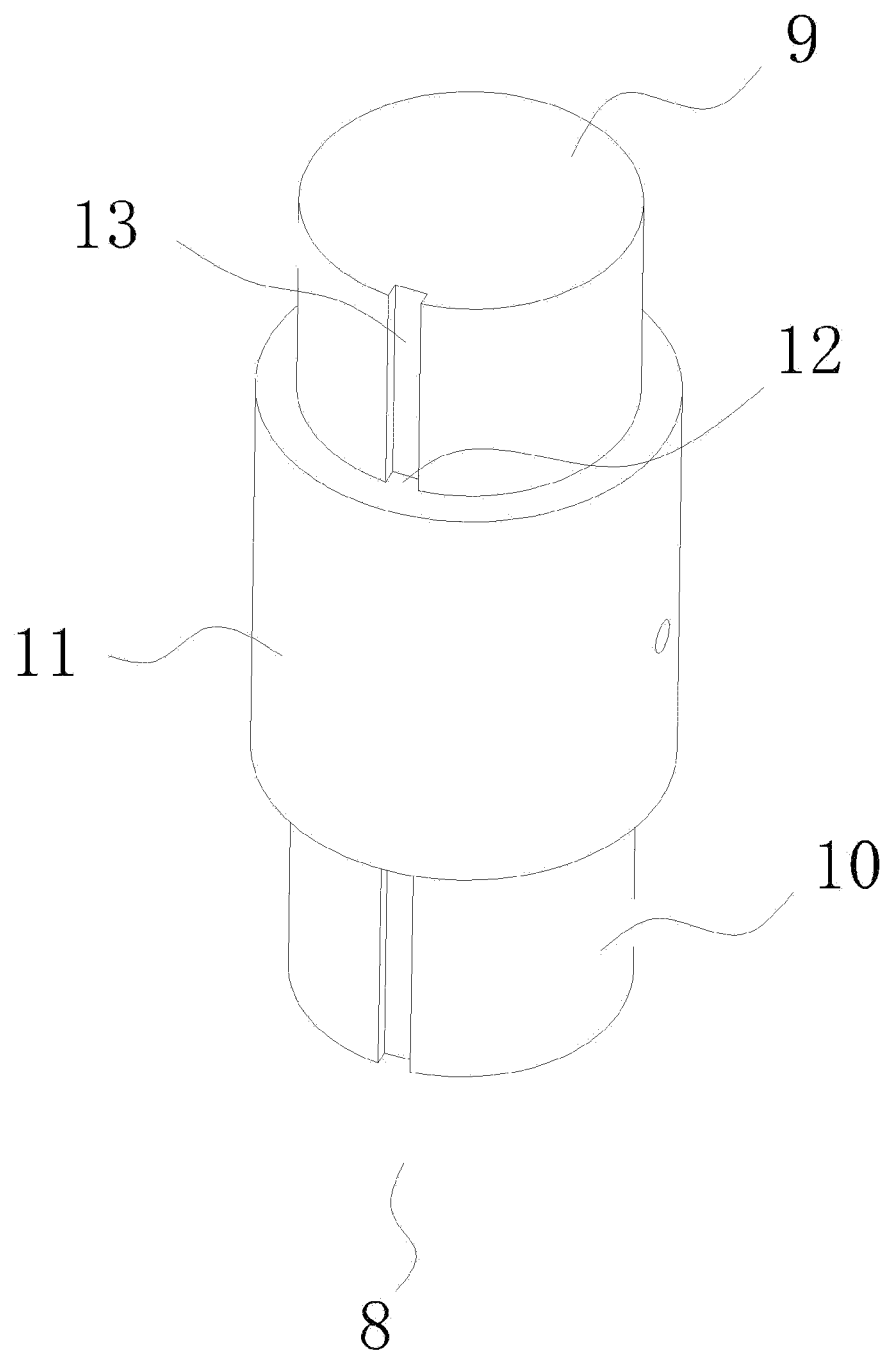
FIG. 8 is a schematic diagram of a one-way displacement control means in an embodiment.
Figure 9:
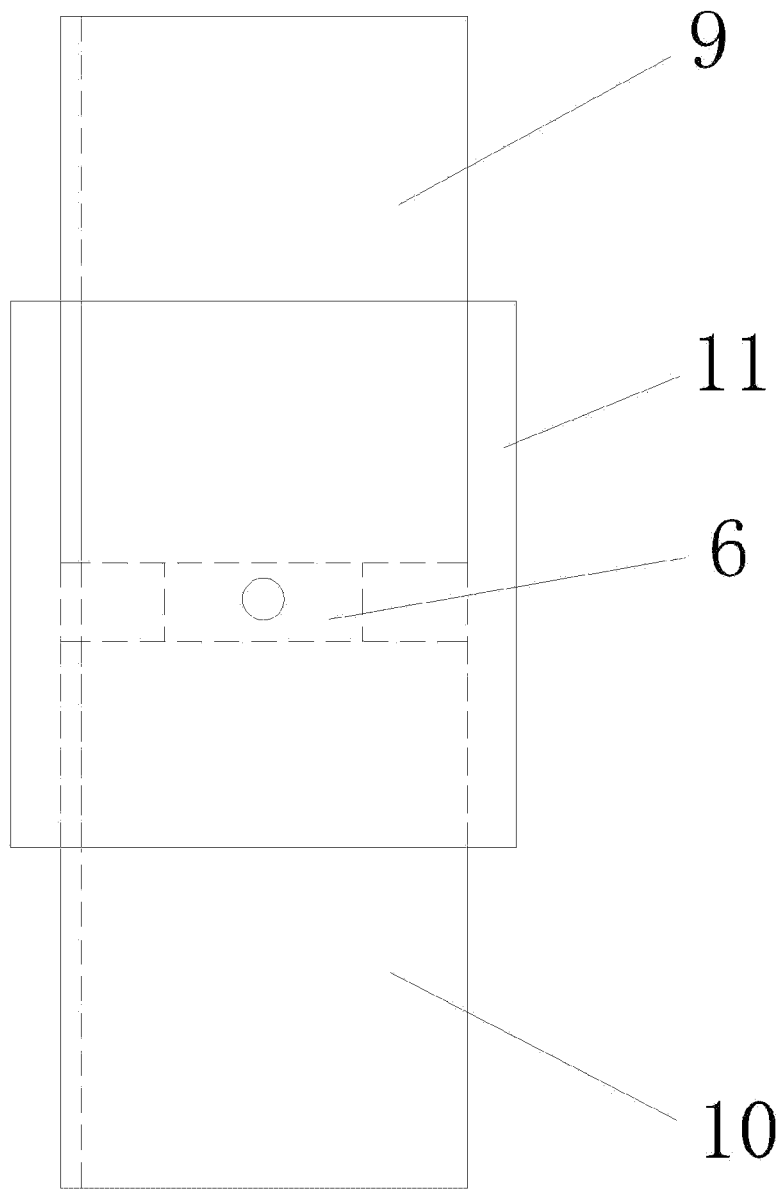
FIG. 9 is a front view of FIG. 8.

A one-way displacement control means 8 as shown in FIGS. 8 and 9 is further provided at a position where the force sensor 6 is mounted. The one-way displacement control means 8 includes a first section 9 connected to the rim body 4 and a second section 10 connected to the spokes 5. The force sensor 6 is provided between the first section 9 and the second section 10, and a sleeve 11 is provided at a joint of the first section 9 and the second section 10. A key 12 is provided in the sleeve 11, the first section 9 and the second section 10 are provided with keyways 13 at corresponding positions, and the key 12 is located in the keyways 13 and moves along the keyways 13. In this way, the first section 9 and the second section 10 cannot rotate relatively, and the force sensor 6 measures a stress in an axial direction of the sleeve 8. The sleeve 11 can be an independent component, or can be integrated with the first section or the second section.

Embodiment II

Figure 2:
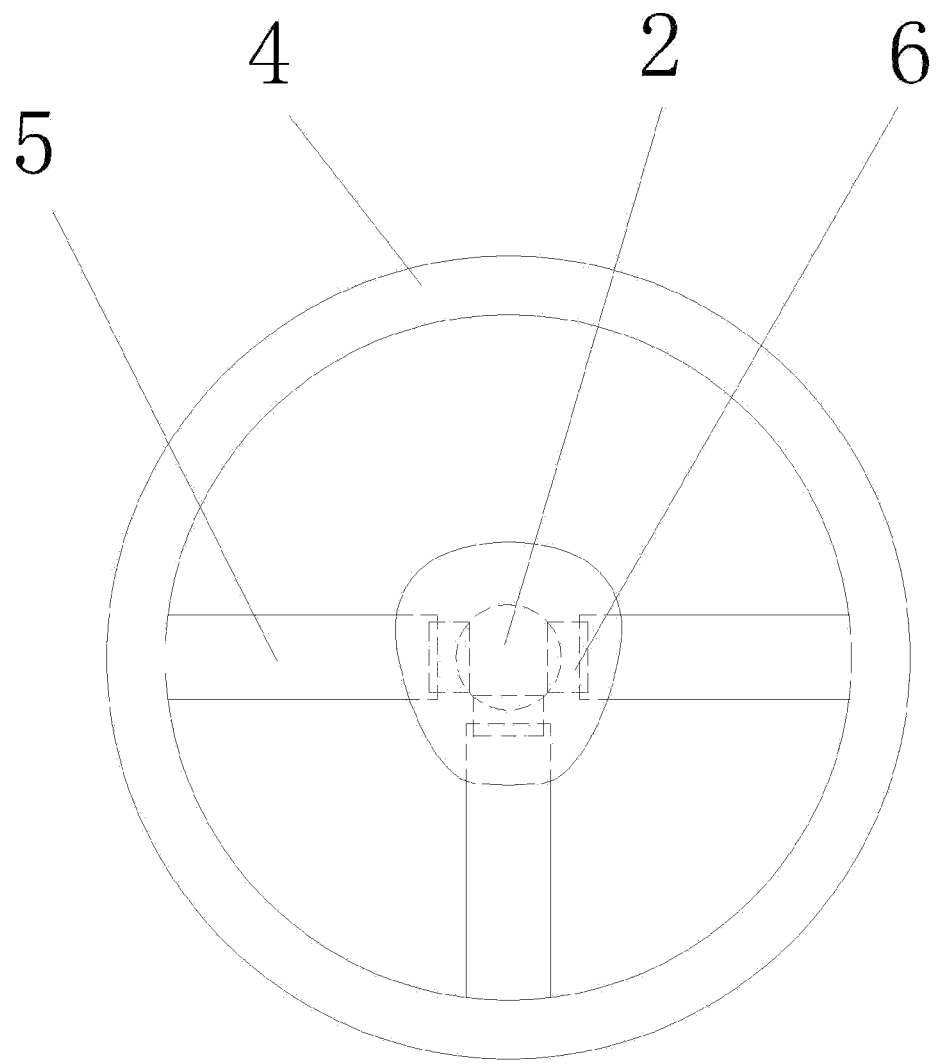
FIG. 2 is a schematic diagram of an overall structure of Embodiment II.

As shown in FIG. 2, compared with Embodiment I, the force sensor 6 in this embodiment is provided between the spokes 5 and the steering shaft 2. Similarly, in order to enable the force sensor 6 to perform directional measurement, a corresponding one-way displacement control means can also be provided.

Embodiment III

Figure 3:
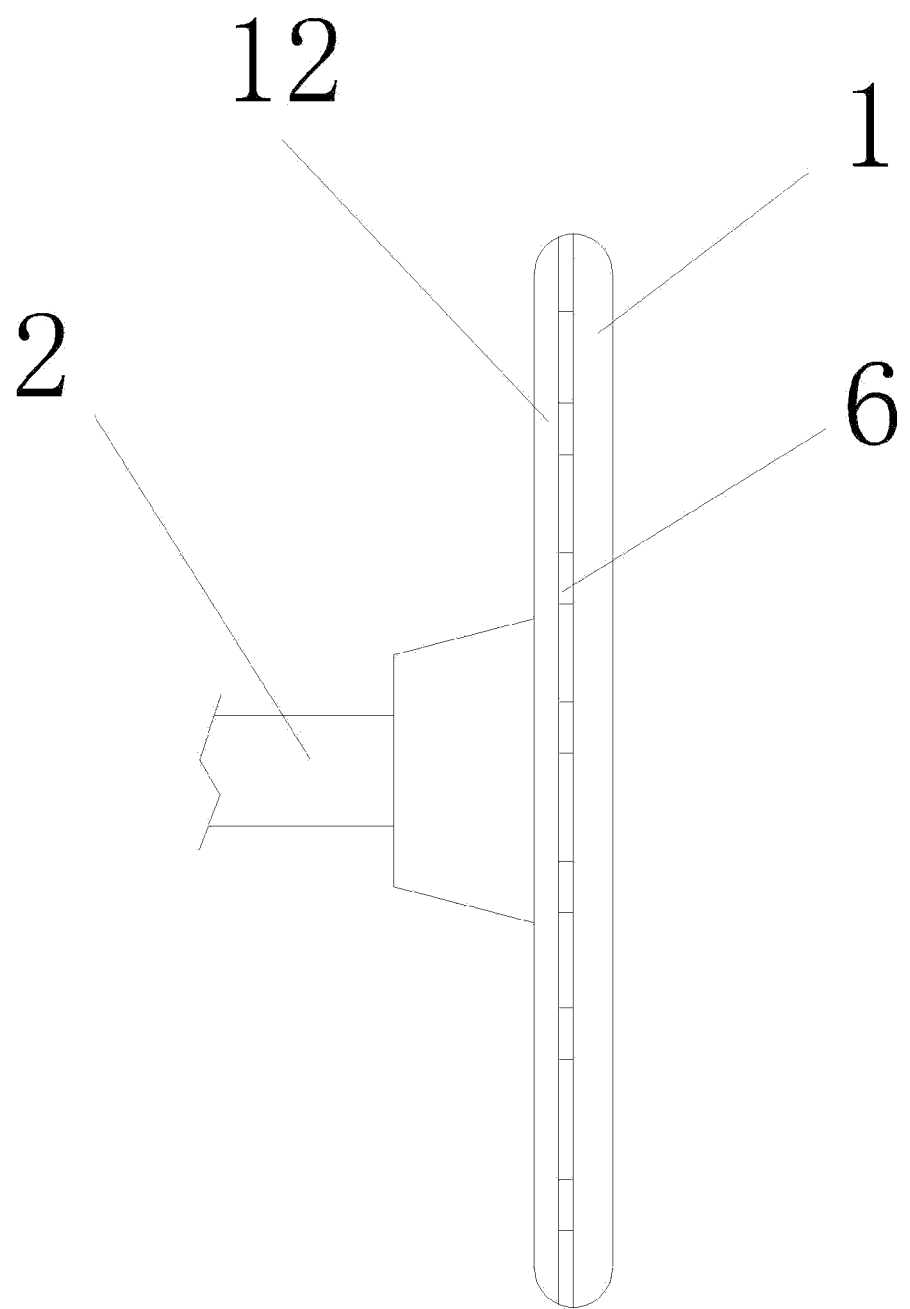
FIG. 3 is a schematic diagram of an overall structure of Embodiment III.

As shown in FIG. 3, a steering wheel assembly having a braking function includes a steering wheel 1, a steering shaft 2, and a rigid ring 12 with a size matching that of the steering wheel 1. The force sensor 6 is provided on one side of the steering wheel 1 away from a driver, between the ring 12 and the steering wheel 1.

Embodiment IV

Figure 4:
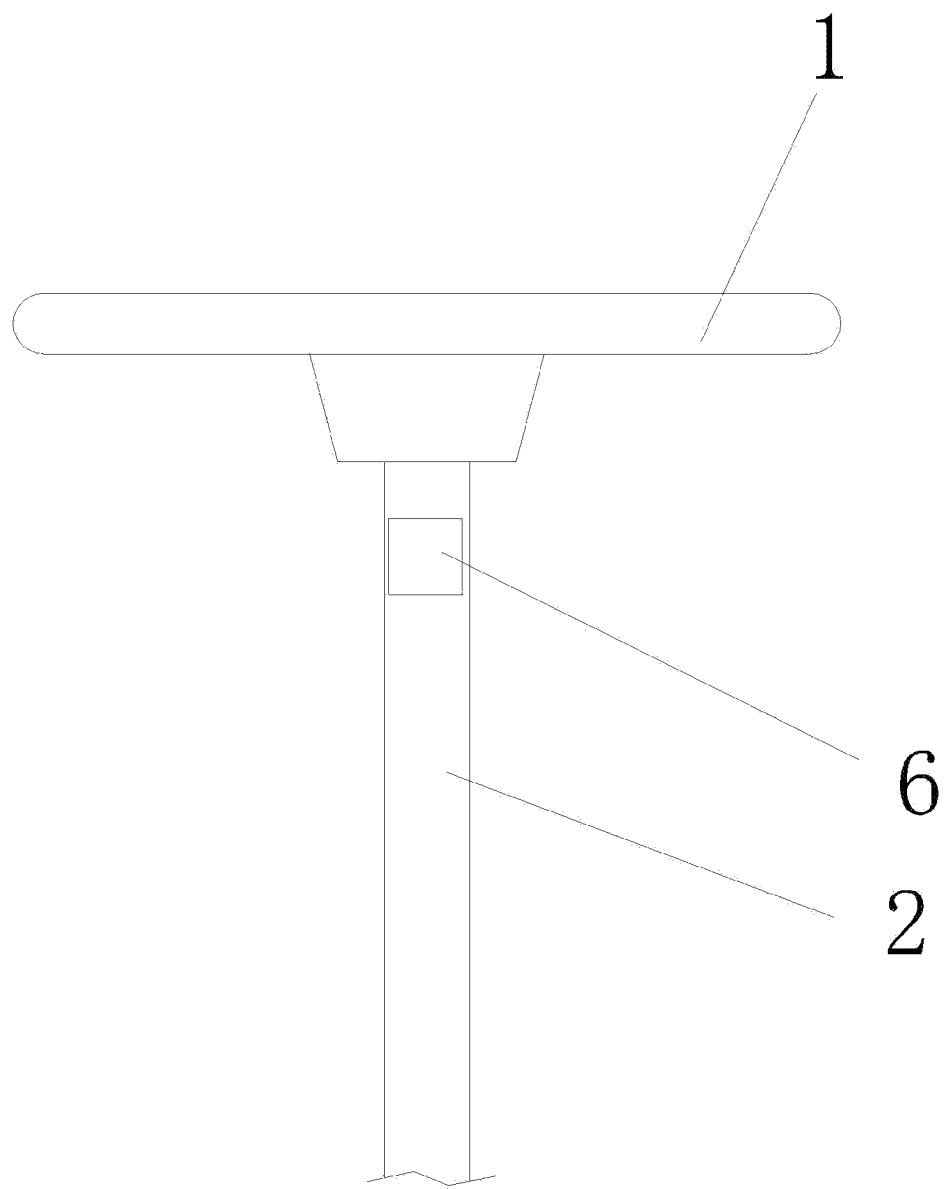
FIG. 4 is a schematic diagram of an overall structure of Embodiment IV.
Figure 5:
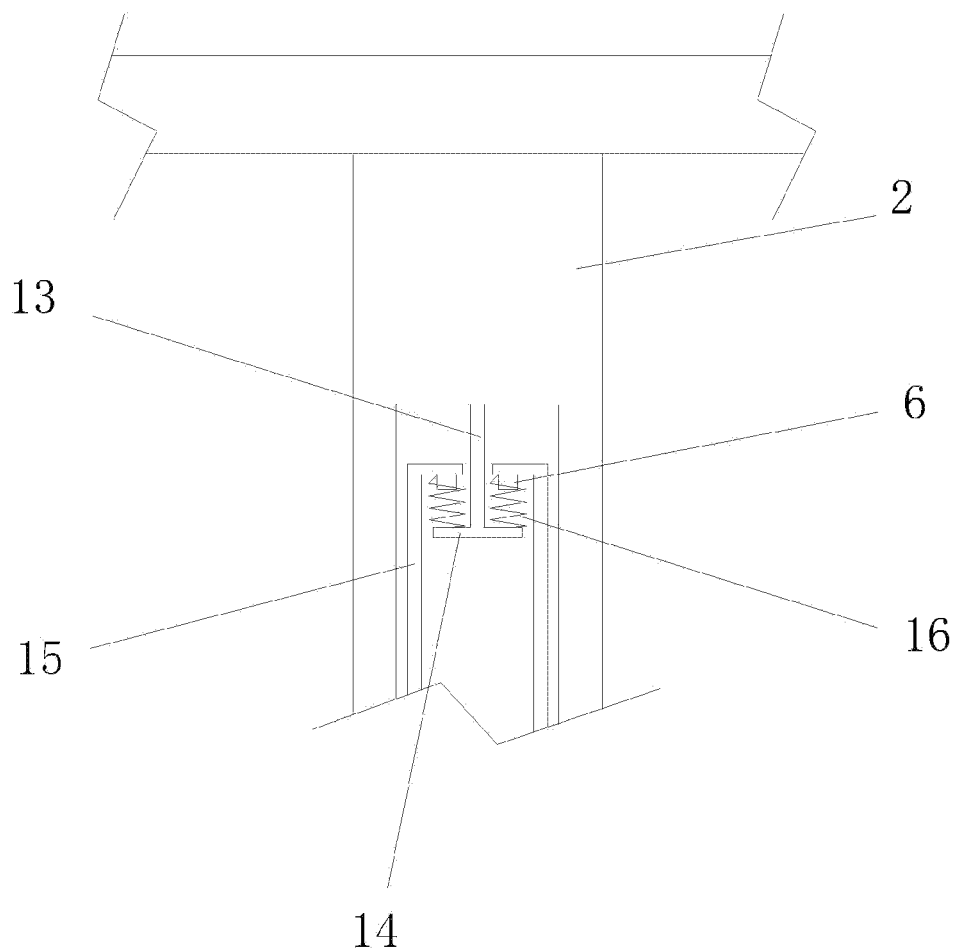
FIG. 5 is a schematic diagram of a partial structure of Embodiment IV.

As shown in FIGS. 4 and 5, in this embodiment, the force sensor 6 is provided on the steering shaft 2, the steering shaft 2 is of a hollow structure, a connecting disk 14 connected to a top portion via a connecting rod 13 is provided inside the steering shaft, and a connecting cylinder 15 with an opening in at least one end is also provided inside the steering shaft; and the connecting rod 13 passes through the opening, at least one supporting spring 16 is provided between an area around the opening and the connecting disk 14, the force sensor 6 is provided in the supporting spring 16 and can be compressed when the supporting spring 16 is compressed to a certain extent, and the connecting cylinder 15 extends out of a bottom end of the steering shaft 2 directly or through an intermediate connector.

Embodiment V

Figure 6:
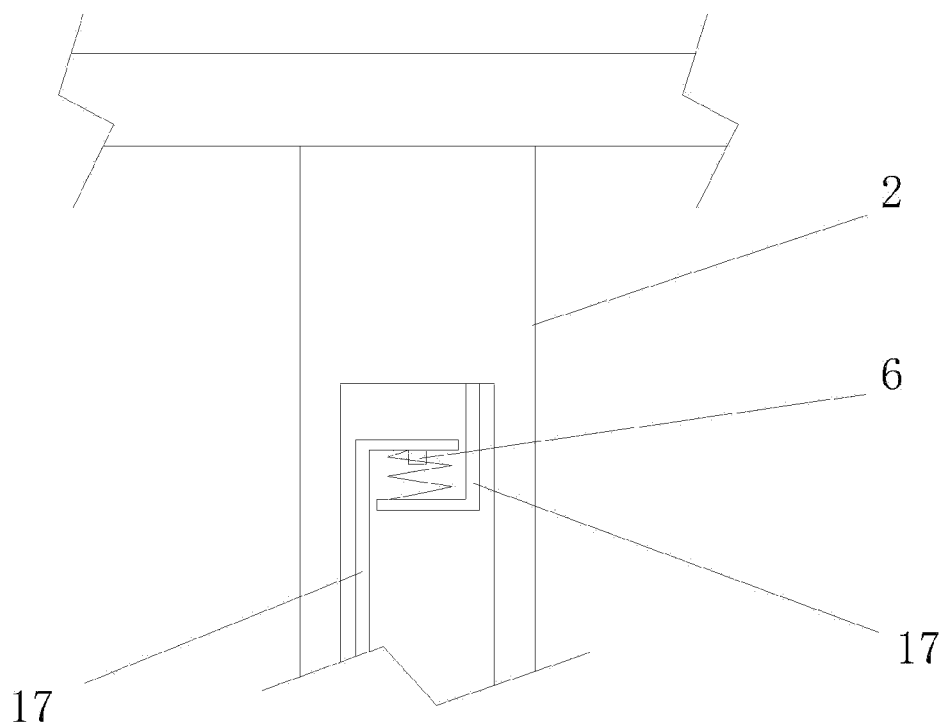
FIG. 6 is a schematic diagram of a partial structure of Embodiment V.

As shown in FIGS. 4 and 6, in this embodiment, the force sensor 6 is provided on the steering shaft 2, the steering shaft 2 is of a hollow structure, within which two hooks 17 with opposite directions are provided. A stem of one hook 17 is fixed to a top portion of the hollow structure, and a stem of the other hook 17 extends out from a bottom end of the steering shaft 2 directly or through an intermediate connector. The force sensor 6 is provided at an intersection of the two hooks 17.

Embodiment VI

Figure 7:
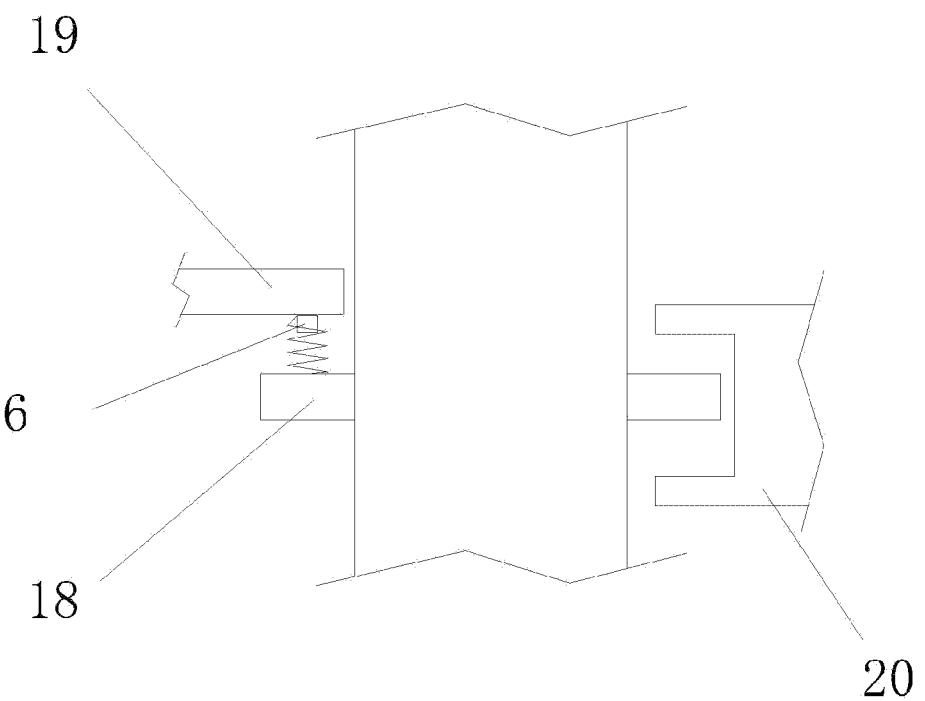
FIG. 7 is a schematic diagram of a partial structure of Embodiment VI.

As shown in FIGS. 4 and 7, in this embodiment, the force sensor 6 is provided on the steering shaft 2 and located on a second bearing table 18 fixed on the steering shaft, and a first bearing table 19 is also provided outside the steering shaft 2; and the force sensor 6 is provided between the first bearing table 19 and the second bearing table 18, and a limiting means 20 corresponding to the second bearing table 18 is also provided. The first bearing table 19 and the limiting means 20 can be fixedly provided on other mechanical components adjacent to the present invention, or can be integral parts of other mechanical components.

The present invention detects the stress on the pressure sensor when the steering wheel is pulled towards a driver. The controller compares the stress on one or more pressure sensors with a preset pressure threshold value. If the stress reaches or exceeds the threshold value, it is determined that braking is required, and the controller sends a braking command to the braking system. In an embodiment using a switch, the controller determines whether to send a braking command to the braking system according to whether the switch is closed or not. An instruction for disabling an accelerator pedal can also be sent out at the same time. On the basis of clearly understanding the principles and structures of the embodiments of the present invention, those skilled in the art can use conventional electronic technology (such as a processor in CN204250008U or a control module in CN105730423A, etc.) or design a circuit as needed to read the data of the pressure sensor and interact with a braking system of a vehicle itself, without paying any creative labor.

Figure 10:
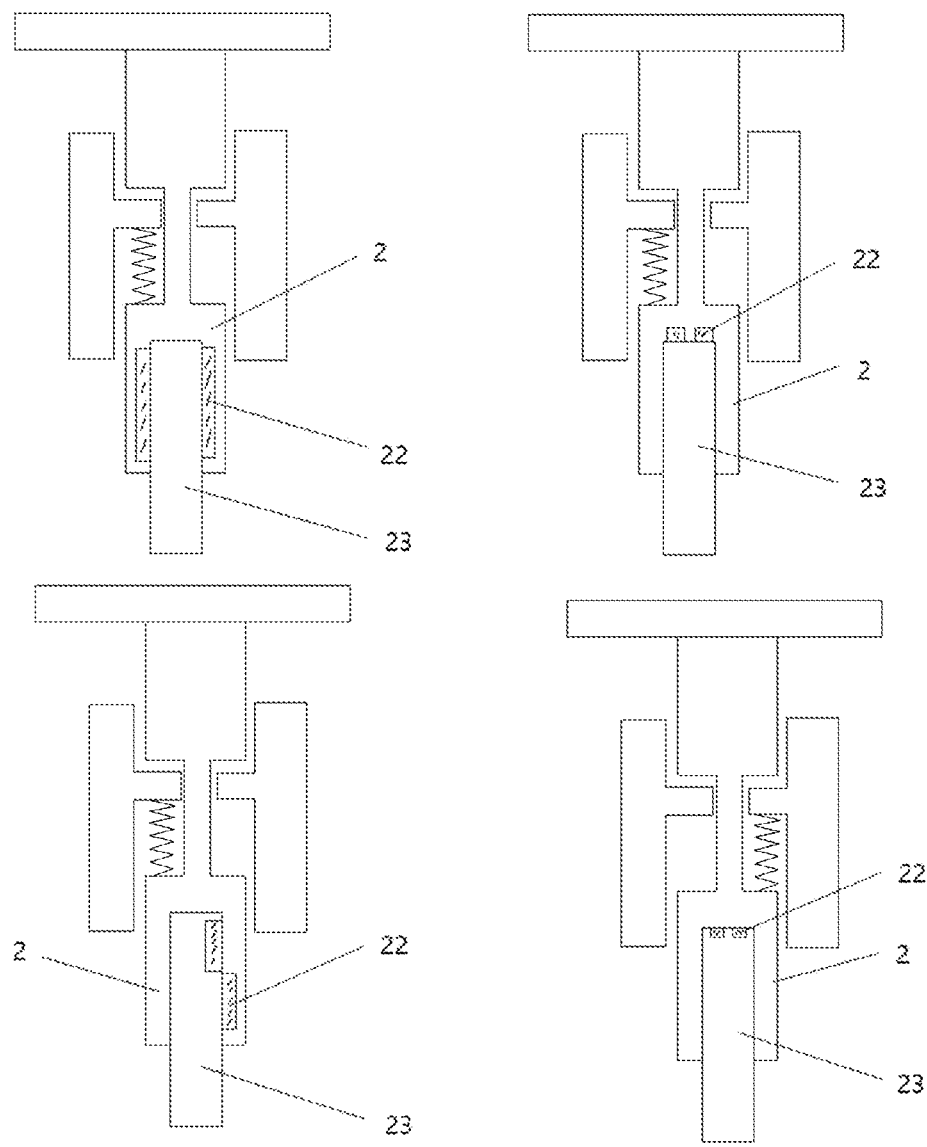
FIG. 10 is a comparative diagram of four installation relationships of a photoelectric sensor, a mechanical wave sensor or a switch.

The communicative connection between the pressure sensor and the controller or between the controller and the braking system may be realized by wired connection or wireless connection, both of which are mature existing technologies. Similarly, in the case that a photoelectric sensor, a mechanical wave sensor or a switch is used, as shown in FIG. 10, the photoelectric sensor, the mechanical wave sensor or the switch 22 may be provided in the hollow structure of the steering shaft 2, or can be separately arranged on the steering shaft 2 and a mandrel 23 corresponding to the steering shaft, where the mandrel 23 and the steering shaft can only move up and down, but cannot rotate. Of course, the actual installation relationship is not limited to the four installation relationships described above, but should also include other installation relationships that can realize this function.

The steering wheel in the previous embodiments is only a steering control apparatus of a conventional automobile. The present invention can be applied not only to vehicles using traditional energy sources such as gasoline and diesel oil, but also to vehicles using relatively new energy sources such as electric energy, solar energy, natural gas, alcohols, hydrogen, and nuclear energy. Further, the present invention can also be applied to control apparatuses of construction machinery, agricultural machinery, driving training simulators, remote driving controllers, or game controllers. Of course, the steering wheel on other apparatuses may have a different form from what is described in the embodiments. The one-way displacement detection apparatuses described in the embodiments are just examples, and the technical effect of the present invention can be realized by any structure capable of independently detecting the pressure in the axial direction of the steering shaft.

The embodiments described herein are only preferred ones of the present invention, but do not limit the concept and scope of the present invention. On the premise of not departing from the design spirit of the present invention, various modifications and improvements made by engineers in the art to the technical schemes of the present invention shall fall within the protection scope of the present invention. All the technical contents requested by the present invention have been recorded in the claims.

What is claimed is:

1. A steering wheel assembly having a braking function, comprising:
   a steering wheel,
   a steering shaft, and
   a controller, wherein
   the steering wheel is connected to one end of the steering shaft and includes a rim body and spokes, the rim body being connected to the steering shaft via the spokes;
   a force sensor is provided on the steering shaft; the force sensor is connected to the controller and sends data related to force detection to the controller;
   the controller is connected to a braking system; and instructions between the force sensor and the controller or between the controller and the braking system can be transmitted by wired or wireless means;
   wherein the steering shaft is of a hollow structure, within which a connecting disk connected to a top portion via a connecting rod and a connecting cylinder having an opening in at least one end are provided, the connecting rod passing through the opening; at least one supporting spring is provided between an area around the opening and the connecting disk; and when the at least one supporting spring is compressed to a certain extent, the force sensor is compressed and the connecting cylinder extends out from an other end of the steering shaft directly or through an intermediate connector.

2. A control apparatus, comprising the steering wheel assembly having a braking function of claim 1.

3. The steering wheel assembly having a braking function of claim 1, wherein a one-way displacement control means is further provided at a position where the force sensor is mounted, the one-way displacement control means comprises keyways provided at two ends, respectively, of the position where the force sensor is mounted and a key, with the key sliding only in one direction along the keyways, so that the force sensor is only pressed in one direction.

4. A steering wheel assembly having a braking function, comprising:
   a steering wheel,
   a steering shaft, and
   a controller, wherein
   the steering wheel is connected to one end of the steering shaft and includes a rim body and spokes, the rim body being connected to the steering shaft via the spokes;
   a force sensor is provided on the steering shaft; the force sensor is connected to the controller and sends data related to force detection to the controller;
   the controller is connected to a braking system; and instructions between the force sensor and the controller or between the controller and the braking system can be transmitted by wired or wireless means;
   wherein the steering shaft is of a hollow structure, within which two hooks in opposite directions are provided, a stem of one of the hooks being fixed to a top portion of the hollow structure and a stem of the other hook extending out from an other end of the steering shaft directly or through an intermediate connector.

5. The steering wheel assembly having a braking function of claim 4, wherein a one-way displacement control means is further provided at a position where the force sensor is mounted, the one-way displacement control means comprises keyways provided at two ends, respectively, of the position where the force sensor is mounted and a key, with the key sliding only in one direction along the keyways, so that the force sensor is only pressed in one direction.

6. A control apparatus, comprising the steering wheel assembly having a braking function of claim 4.

7. A steering wheel assembly having a braking function, comprising:
    a steering wheel,
    a steering shaft, and
    a controller, wherein
    the steering wheel is connected to one end of the steering shaft and includes a rim body and spokes, the rim body being connected to the steering shaft via the spokes;
    a force sensor is provided on the steering shaft; the force sensor is connected to the controller and sends data related to force detection to the controller;
    the controller is connected to a braking system; and instructions between the force sensor and the controller or between the controller and the braking system can be transmitted by wired or wireless means;
    wherein a first bearing table is further provided, a second bearing table is provided on the steering shaft, the force sensor is provided between the first bearing table and the second bearing table, and a limiting means corresponding to the second bearing table is also provided.

8. The steering wheel assembly having a braking function of claim 7, wherein a one-way displacement control means is further provided at a position where the force sensor is mounted, the one-way displacement control means comprises keyways provided at two ends, respectively, of the position where the force sensor is mounted and a key, with the key sliding only in one direction along the keyways, so that the force sensor is only pressed in one direction.

9. A control apparatus, comprising the steering wheel assembly having a braking function of claim 7.

* * * * *